United States Patent
Oike et al.

(10) Patent No.: US 8,879,820 B2
(45) Date of Patent: Nov. 4, 2014

(54) COMPONENT IMAGE PROCESSING APPARATUS AND COMPONENT IMAGE PROCESSING METHOD

(75) Inventors: Hiroshi Oike, Chiryu (JP); Kenji Sugiyama, Anjo (JP)

(73) Assignee: Fuji Machine Mfg. Co., Ltd., Chiryu-shi (JP)

(*) Notice: Subject to any disclaimer, the term of this patent is extended or adjusted under 35 U.S.C. 154(b) by 838 days.

(21) Appl. No.: 13/086,900

(22) Filed: Apr. 14, 2011

(65) Prior Publication Data
US 2011/0261218 A1    Oct. 27, 2011

(30) Foreign Application Priority Data
Apr. 21, 2010   (JP) ................................. 2010-098299

(51) Int. Cl.
G06K 9/00    (2006.01)
G06T 3/00    (2006.01)
G06T 3/40    (2006.01)
G01B 11/00   (2006.01)

(52) U.S. Cl.
CPC . G01B 11/00 (2013.01); G06T 3/00 (2013.01); G06T 3/4038 (2013.01)

USPC .......................................................... 382/141

(58) Field of Classification Search
None
See application file for complete search history.

(56) References Cited

U.S. PATENT DOCUMENTS

| 2011/0188726 A1* | 8/2011 | Nathaniel et al. ............. 382/132 |
| 2012/0128229 A1* | 5/2012 | Sucro et al. .................... 382/145 |

FOREIGN PATENT DOCUMENTS

| JP | 02-002896 U | 1/1990 |
| JP | 05-037195 A | 2/1993 |
| JP | 2008-211009 A | 9/2008 |

* cited by examiner

Primary Examiner — Nirav G Patel
(74) Attorney, Agent, or Firm — Foley & Lardner LLP (57) ABSTRACT

To image a component larger than the field of view of a camera, a range based on the shape and dimension of the component to be imaged and the field of view of the camera, a range of the component is divided, and imaging ranges of a plurality of characteristic parts to be imaged are determined. Then, images of the plurality of characteristic parts obtained by imaging the plurality of characteristic parts with the camera are combined to create a combined image of the characteristic parts of the component. Based on the combined image, the position of the component is measured.

4 Claims, 9 Drawing Sheets

COMPONENT

FIG. 7

COMPONENT

COMPONENT IMAGE PROCESSING APPARATUS AND COMPONENT IMAGE PROCESSING METHOD

BACKGROUND OF THE INVENTION

1. Field of the Invention

The present invention relates to a component image processing apparatus and component image processing method in which a component larger than the field of view of a camera is partially imaged for image processing and the position of the component is measured based on the image processing result.

2. Description of the Related Art

Figure 12:
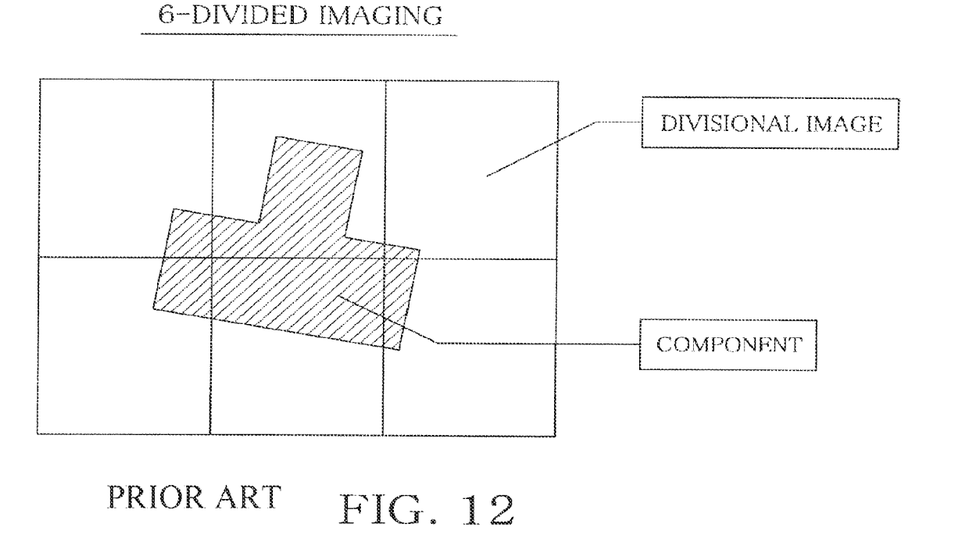
FIG. 12 is a drawing for describing a conventional component divisional image processing technique.

Conventionally, as depicted in FIG. 12, to image a component larger than the field of view of a camera for image processing, an entire area of the component to be imaged is divided into plural so as to come within the field of view of the camera, each divisional area is imaged by the camera, and then imaged images of the plurality of division areas are synthesized into a synthetic image of the whole component. Based on the synthetic image, a component position measuring process is performed (refer to Japanese Unexamined Patent Application Publication No. 2008-211009).

This application claims priority from Japanese Patent Application 2010-098299, filed Apr. 21, 2010, which is incorporated herein by reference in its entirety.

However, in this method, it is required to repeat the movement of the camera and imaging as many as the number of divisional areas, thereby disadvantageously increasing an image processing cycle time.

Figure 13:
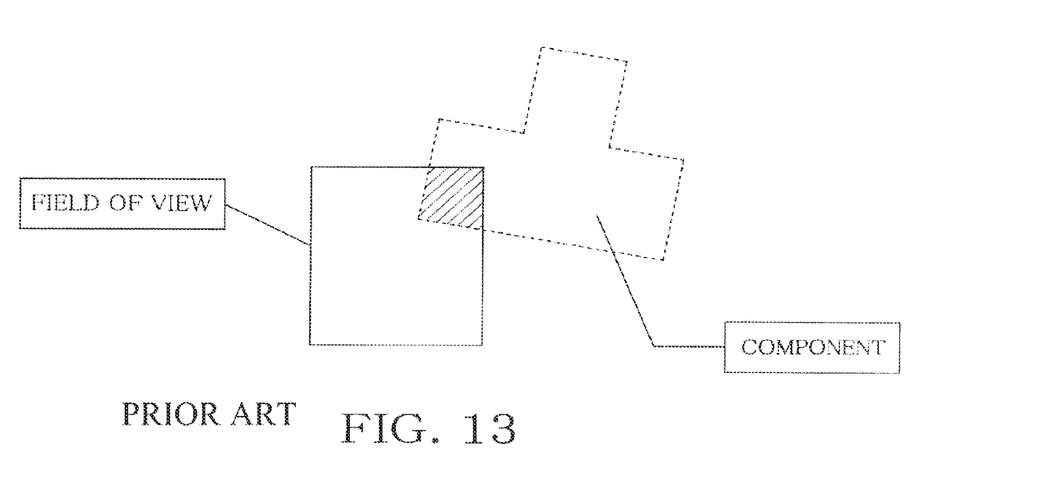
FIG. 13 is a drawing for describing an improved conventional large component position measuring technique.

Thus, as depicted in FIG. 13, in one technique, only a part of the component is imaged by a camera, and the whole component is estimated based on the imaged image and the position of the component is measured.

However, in the method of imaging only a part of the component, even if a distance between the component and the camera deviates and the size of the component image, that is, the imaging magnification, deviates, this deviation cannot be recognized. Also, unless a characteristic part of the component is not within one imaged image, the component position measurement accuracy is disadvantageously degraded.

SUMMARY OF THE INVENTION

A problem to be solved by the invention is to achieve a reduction in image processing cycle time and an improvement in component position measurement accuracy when a component larger than the field of view of a camera is partially imaged to measure the position of the component.

To solve the problem, the present invention is directed to a component image processing apparatus that partially images a component larger than a field of view of a camera for image processing and measures a position of the component based on the image processing result, the apparatus including imaging range determining means that determines imaging ranges of a plurality of characteristic parts to be imaged obtained by division from a range of the component to be imaged, combined image creating means that combines images of the plurality of characteristic parts obtained by imaging the plurality of characteristic parts with the camera to create a combined image of the characteristic parts of the component, and measuring means that measures a position of the component based on the combined image of the characteristic parts of the component.

In this structure, to partially image a component larger than the field of view of a camera, imaging ranges of a plurality of characteristic parts are determined from a range of one component and imaged, and the imaged images of the plurality of characteristic parts are combined to create a combined image of the characteristic parts of the component. Therefore, even if a distance between the component and the camera deviates and the size of the component image, that is, imaging magnification, deviates, this deviation can be recognized. Also, the position of the component can be accurately measured with reference to the plurality of characteristic parts. Furthermore, since parts other than the characteristic parts of the component do not have to be imaged, the image processing cycle time can also be reduced compared with the case of dividing the entire area of the component for imaging.

In this case, for example, an imaging range of the characteristic part of the component may be determined in advance, its data may be stored in a storage device, and the imaging range of the characteristic part may be read from the storage device before imaging. Alternatively, an operator may operate an input device, such as a keyboard and a mouse, before imaging to input an imaging range of a characteristic part.

Alternatively, imaging ranges of a plurality of characteristic parts may be automatically determined based on either one or both of a shape and dimension of the component to be imaged and the field of view of the camera. With this, the imaging ranges of the characteristic parts can be automatically determined.

To automatically determine imaging ranges of a plurality of characteristic parts, it is preferable to select a range allowing a full length of the component in each of X and Y directions to be measured.

Considering that the shape of a component is generally a tetragon, two imaging ranges each taking two corners positioned in a diagonal direction of the component to be imaged as characteristic parts may be determined. With this, when the shape of the component is a tetragon, the full length in each of X and Y directions of the component can be measured from two characteristic parts.

Also, in the present invention, an entire area of the component may be divided into partial areas as many as required for imaging based on a dimension of the component to be imaged and the field of view of the camera, and a plurality of partial areas may be selected in order of decreasing amount of information included in each partial area obtained by division as imaging ranges of the plurality of characteristic parts. Here, as the amount of information, for example, the number of edge points, the number of outlines, the number of directions of outlines, the number of corners, or a distance between imaging ranges may be used. With this, a part having a more significant characteristic in the component can be automatically selected and determined as an imaging range.

DETAILED DESCRIPTION OF THE PREFERRED EMBODIMENTS

An embodiment in which a mode for carrying out the present invention is applied and implemented to a component mounting machine is described below.

Figure 1:
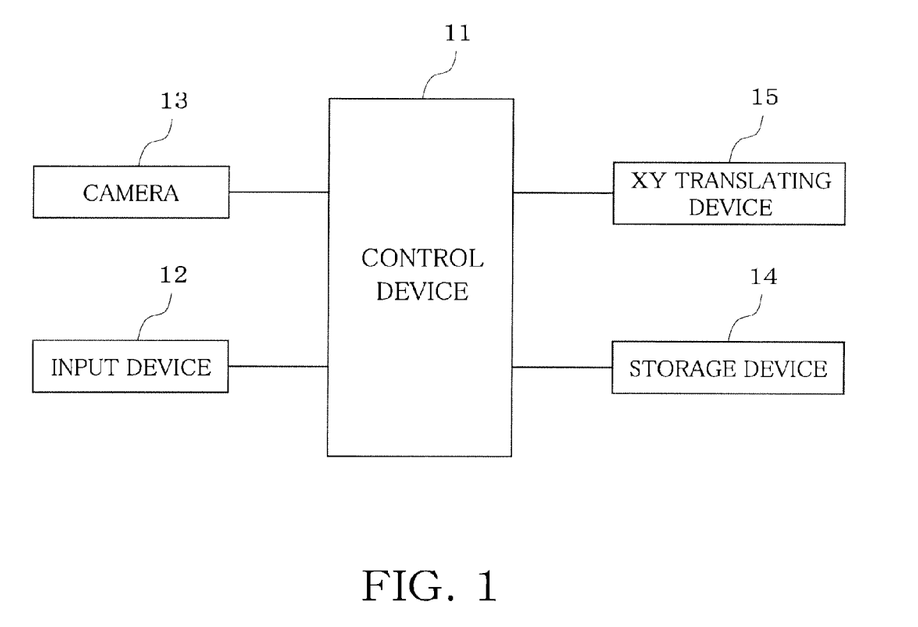
FIG. 1 is a block diagram for schematically describing the structure of a component image processing apparatus for use in an embodiment of the present invention.

First, the structure of a component image processing apparatus is schematically described based on FIG. 1.

A control device 11 controls a component mounting machine and also controls component image processing, which will be described further below. For example, the control device 11 is configured of a computer, such as a personal computer or a work station. To this control device 11, an input device 12 such as a keyboard, a mouse, and a touch panel, a camera 13 imaging a component, and a storage device 14 such as a hard disk drive, an MO disk drive, and a USB memory storing various information such as various data and control programs.

When a component larger than the field of view of the camera 13 is to be imaged, the control device 11 causes a placing head (not shown) at which a suction nozzle suctioning a component is retained to be translated by the XY translating device 15 in an XY direction as appropriate and causes a characteristic part of the component to be imaged by the camera 13.

Here, when a characteristic part of a component supplied from a tray feeder or the like is imaged from above before component suction, for example, the camera such as a mark camera can be translated as appropriate in an XY direction to image a characteristic part of the component.

The control device 11 functions as imaging range determining means that divides a range of the component to be imaged and determines imaging ranges of a plurality of characteristic parts to be imaged, combined image creating means that combines images of the plurality of characteristic parts obtained by imaging the plurality of characteristic parts with the camera 13 to create a combined image of the characteristic parts of the component, and measuring means that measures a position of the component based on the combined image of the characteristic parts of the component.

In this case, for example, an imaging range of the characteristic part of the component may be determined in advance, its data may be stored in a storage device 14, and the imaging range of the characteristic part may be read from the storage device 14 before imaging. Alternatively, an operator may operate the input device 12 before imaging to input data of an imaging range of a characteristic part.

Furthermore, the present embodiment provides a function of automatically determining imaging ranges of a plurality of characteristic parts based on either one or both of a shape and dimension of the component to be imaged and the field of view of the camera. To automatically determine imaging ranges of a plurality of characteristic parts, it is preferable to select a range allowing a full length of the component in each of X and Y directions to be measured.

When the shape of a component is a tetragon, two imaging ranges each taking two corners positioned in a diagonal direction of the component as characteristic parts can be determined. With this, when the shape of the component is a tetragon, the full length in each of X and Y directions of the component can be measured from two characteristic parts.

Furthermore, the present embodiment provides a function of dividing an entire area of the component into partial areas as many as required for imaging based on a dimension of the component to be imaged and the field of view of the camera 13, and selecting a plurality of partial areas in order of decreasing amount of information included in each partial area obtained by division as imaging ranges of the plurality of characteristic parts. Here, as the amount of information, for example, the number of edge points, the number of outlines, the number of directions of outlines, the number of corners, or a distance between imaging ranges may be used. With this, a part having a more significant characteristic in the component can be automatically selected and determined as an imaging range.

A method of determining imaging ranges of characteristic parts and a method of measuring a component position in the present embodiment are described below by using flowcharts of FIG. 2 and FIG. 3.

Figure 2:
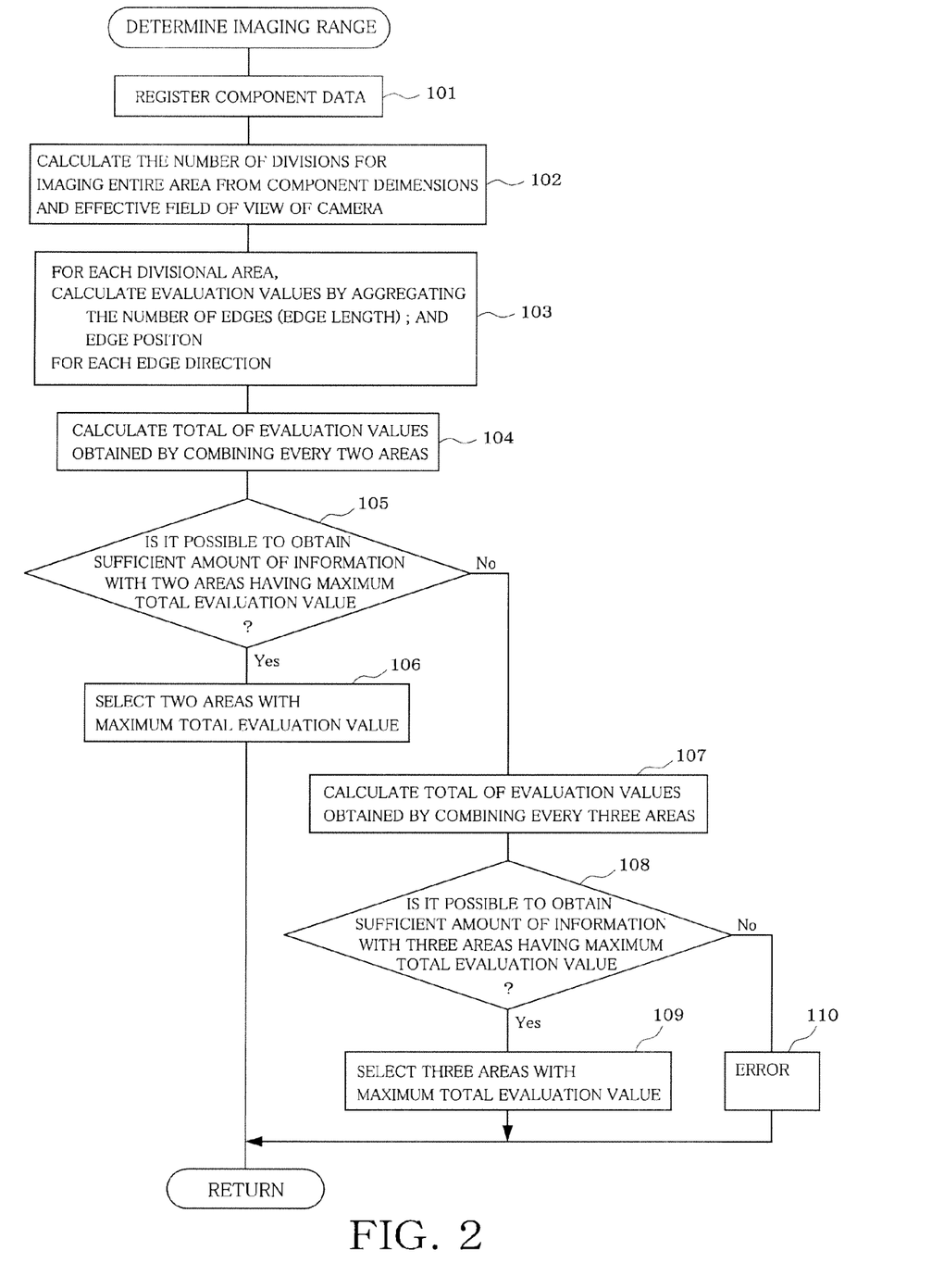
FIG. 2 is a flowchart depicting a process flow of determining imaging ranges of characteristic parts of a component.
Figure 3:
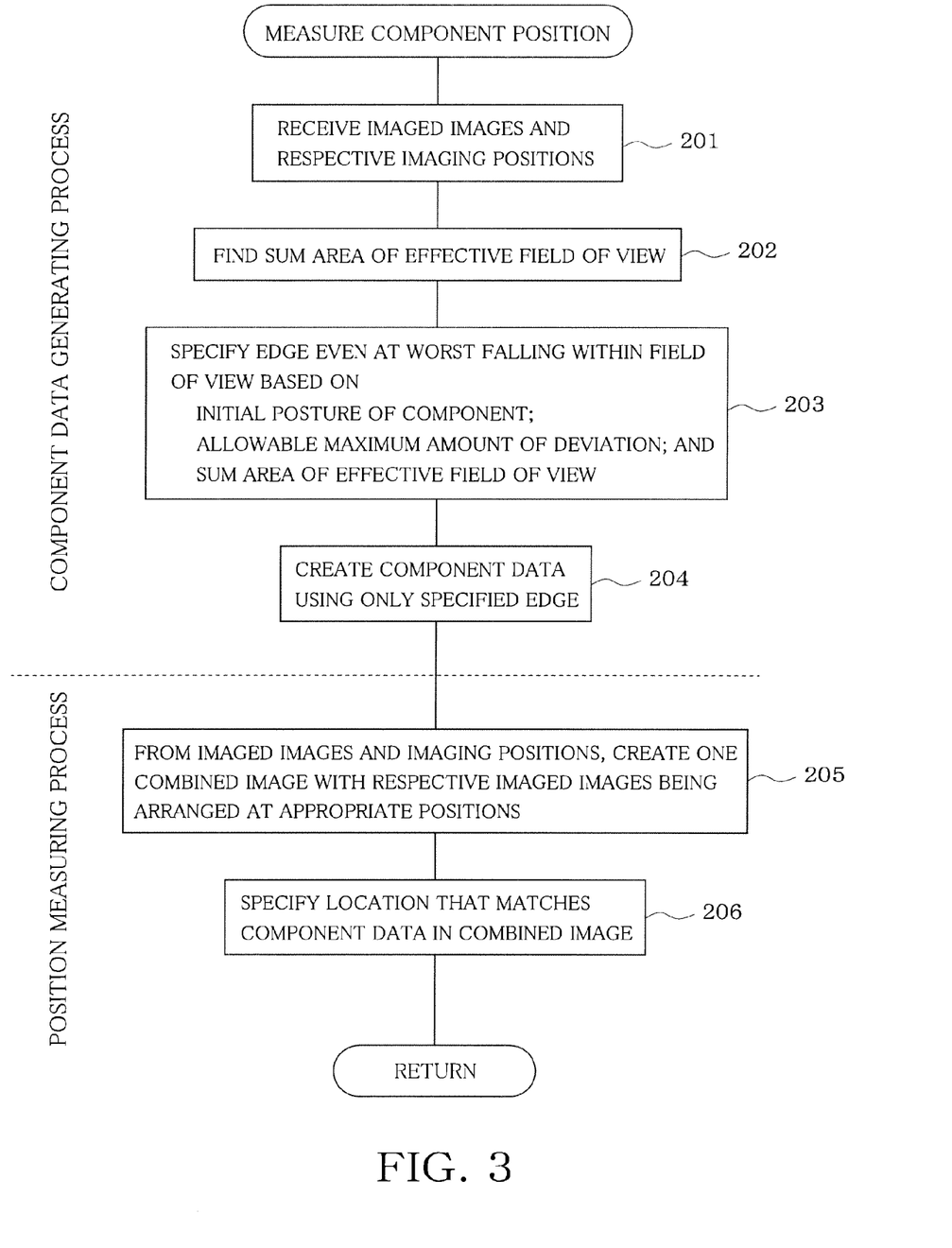
FIG. 3 is a flowchart depicting a process flow of a component position measuring process.
Figure 4:
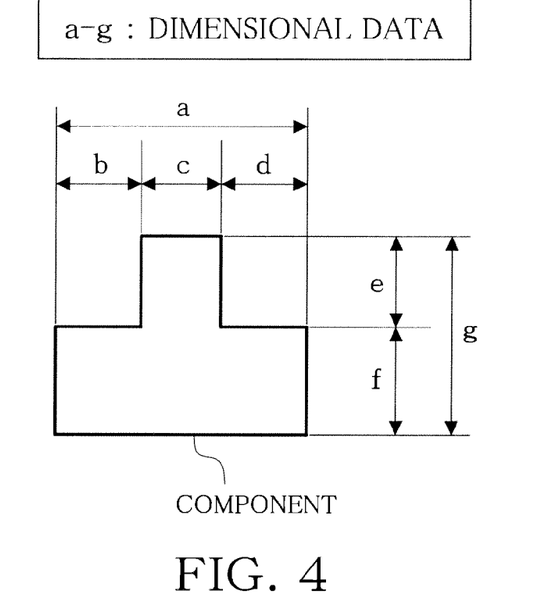
FIG. 4 is a drawing for describing an example of dimensional data of a component.
Figure 5:
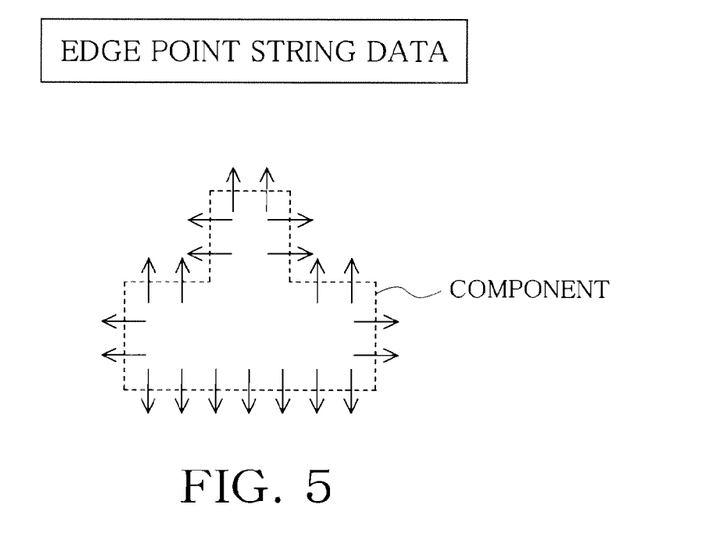
FIG. 5 is a drawing for describing an example of edge point string data.

As depicted in FIG. 2, to determine imaging ranges of characteristic parts, first at step 101, an operator registers data of a component to be imaged in the storage device 14. Here, the data of the component may be data of geometrically defined dimensions (refer to FIG. 4), data of color, and others. Alternatively, the data of the component may be data directly usable for image processing, such as edge point string data (refer to FIG. 5).

Then, processes at step 102 onward is automatically executed by the control device 11. First at step 102, the number of divisions required for dividing the entire area of the component and imaging is calculated based on the dimensions of the component and the effective field of view of the camera 13. The procedure then goes to step 103, where, for each divisional area, evaluation values is calculated by aggregating the number of edges (edge length) and an edge position for each edge direction.

Then, at next step 104, a total of evaluation values obtained by combining every two areas is calculated. The procedure then goes to step 105, where whether it is possible to obtain a sufficient amount of information with two areas having a maximum total evaluation value is determined by determining whether the total evaluation value is equal to or greater than a predetermined value. As a result, when it is determined that it is possible to obtain a sufficient amount of information with two areas having a maximum total evaluation value, the procedure goes to step 106, where these two areas having a maximum total evaluation values are each selected as an imaging range of a characteristic part.

On the other hand, when it is determined that it is not possible to obtain a sufficient amount of information with two areas having a maximum total evaluation value, the procedure goes to step 107, where a total of evaluation values obtained by combining every three areas is calculated. The procedure then goes to step 108, where whether it is possible to obtain a sufficient amount of information with three areas having a maximum total evaluation value is determined by determining whether the total evaluation value is equal to or greater than a predetermined value. As a result, when it is determined that it is possible to obtain a sufficient amount of information with three areas having a maximum total evaluation value, the procedure goes to step 109, where these three areas having a maximum total evaluation values are each selected as an imaging range of a characteristic part.

On the other hand, when it is determined that it is not possible to obtain a sufficient amount of information with three areas having a maximum total evaluation value, the procedure goes to step 110, where an error is determined. In this case, after all divisional areas are each imaged with the camera 13, these imaged images may be combined to create a combined image of one component as a whole.

After imaging ranges of a plurality (two or three) characteristic parts are determined from among all areas of one component through the procedure described above, the plurality of characteristic parts are each imaged with the camera 13, and signals of these imaged images are transmitted to the control device 11. The control device 11 measures the position of the component through a procedure depicted in FIG. 3. Specifically, first at step 201, data of imaged images of the plurality of characteristic parts and their respective imaging positions transmitted from the camera 13 are received.

Figure 6:
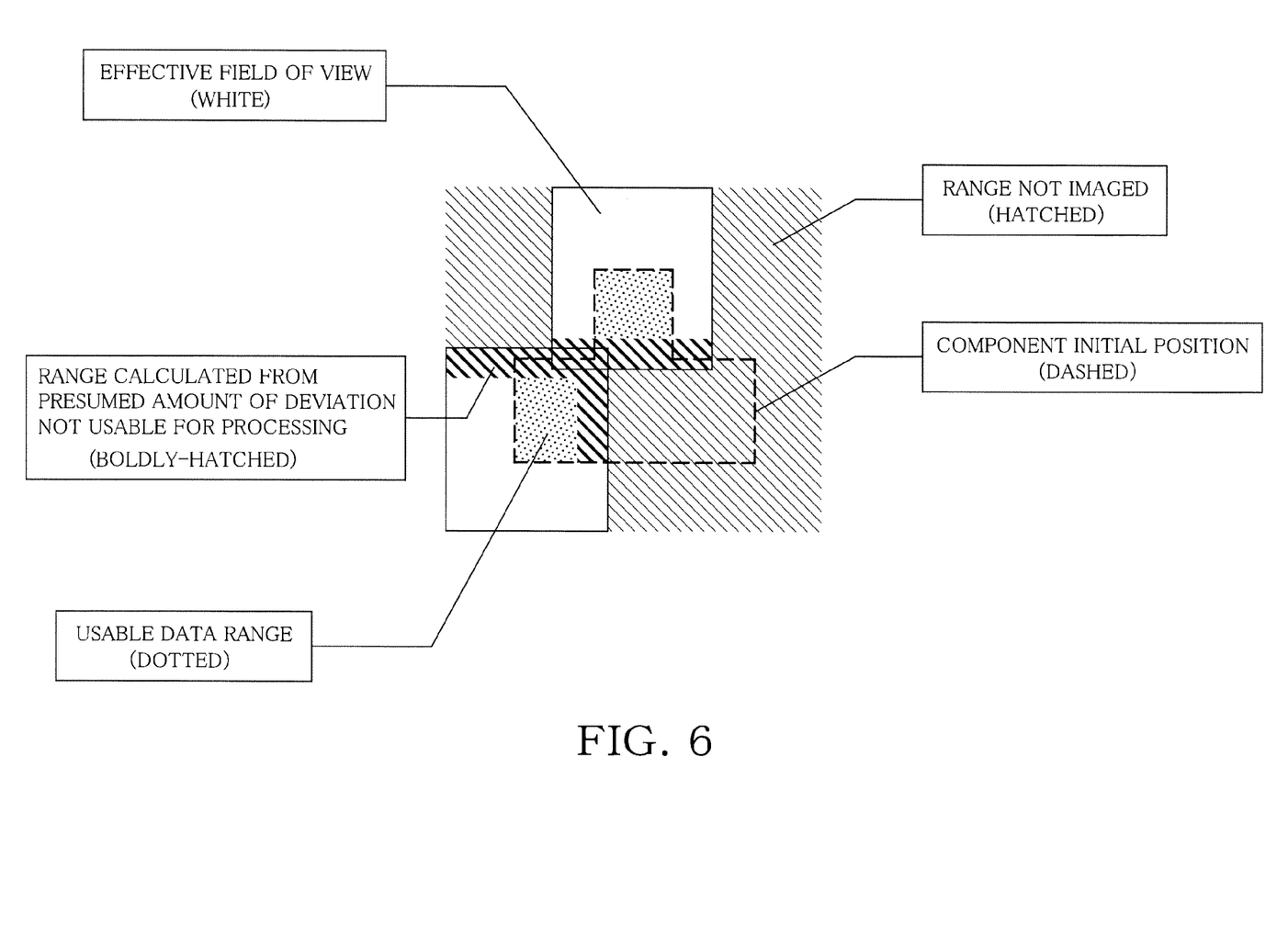
FIG. 6 is a drawing for describing a method of finding a sum area of an effective field of view.

At next step 202, a sum area of the effective field of view of the camera 13 imaging the plurality of characteristic parts is found (refer to FIG. 6). The procedure then goes to step 203, where an edge even at worst falling within the field of view of the camera 13 is specified based on an initial posture of the component, an allowable maximum amount of deviation, and the sum area of the effective field of view.

Figure 7:
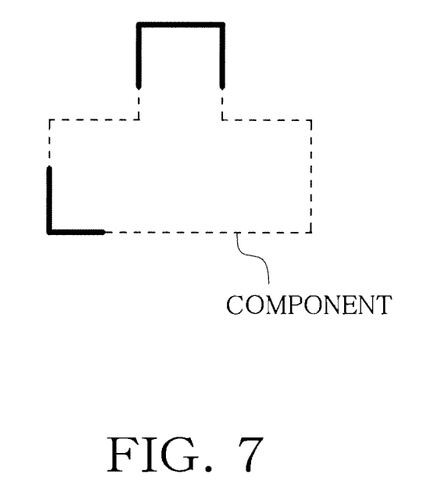
FIG. 7 is a drawing that depicts a first example of component data.
Figure 8:
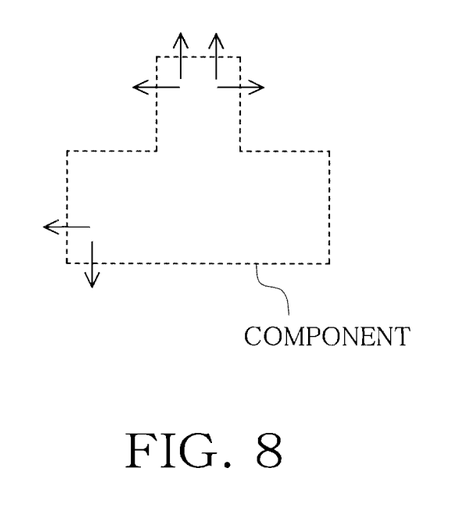
FIG. 8 is a drawing that depicts a second example of component data.

The procedure then goes to step 204, where, for example, existing pattern matching or the like is used to create component data using only the specified edge (refer to FIG. 7 and FIG. 8).

Figure 9:
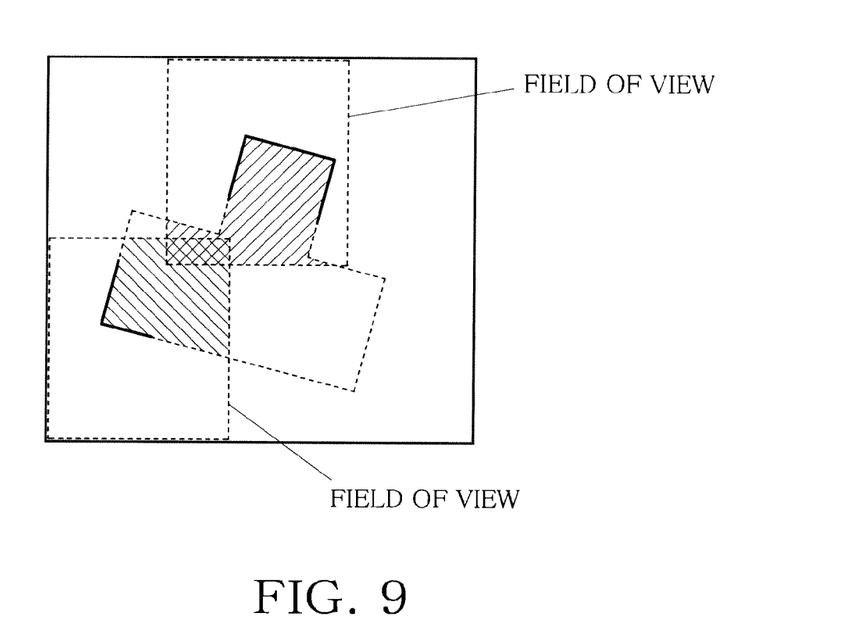
FIG. 9 is a drawing that depicts a first example of a combined image.
Figure 10:
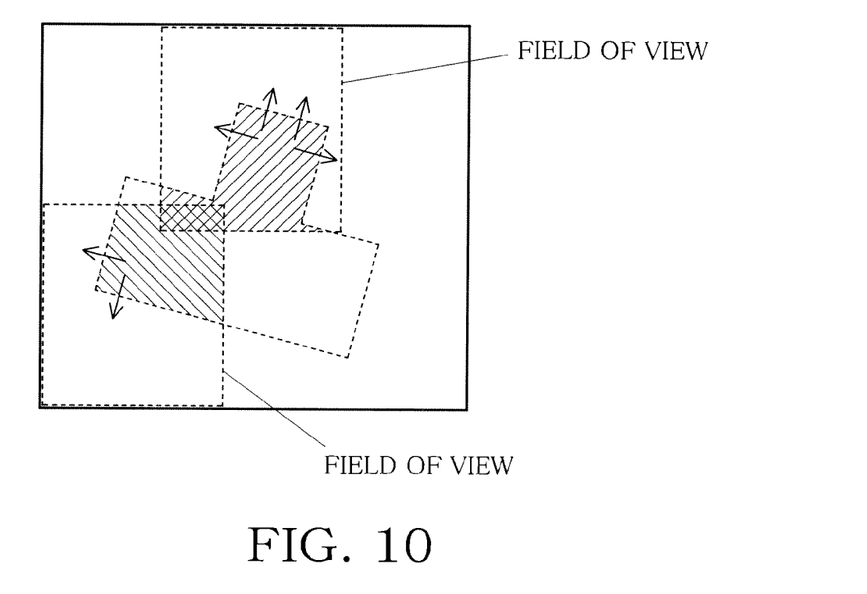
FIG. 10 is a drawing that depicts a second example of a combined image.

Then, at next step 205, from the imaged images of the plurality of characteristic parts and their respective imaging positions, one combined image is crated with the imaged images of the characteristic parts being arranged at appropriate positions and combined (tiled) (refer to FIG. 9 or FIG. 10). Regarding an insufficient image range at the time of image combining, the range can be as being filled with blank pixels.

The procedure then goes to step 206, where a location that matches the component data in the combined image is specified, and the position of the component is measured.

In the present embodiment described above, when a component larger than the field of view of the camera 13 is imaged, imaging ranges of a plurality of characteristic parts to be imaged obtained by division from a range of a component to be imaged is determined, images of the plurality of characteristic parts obtained by imaging each of the plurality of characteristic parts with the camera 13 are combined to create a combined image of the characteristic parts of the component, and, the position of the component is measured based on the combined image. Therefore, even when the distance between the component and the camera 13 deviates and the size of the component image (imaging magnification) deviates, this deviation can be recognized. Also, the position of the component can be accurately measured with reference to the plurality of characteristic parts. Furthermore, since parts other than the characteristic parts of the component do not have to be imaged, the image processing cycle time can also be reduced compared with the case of dividing the entire area of the component for imaging.

Figure 11:
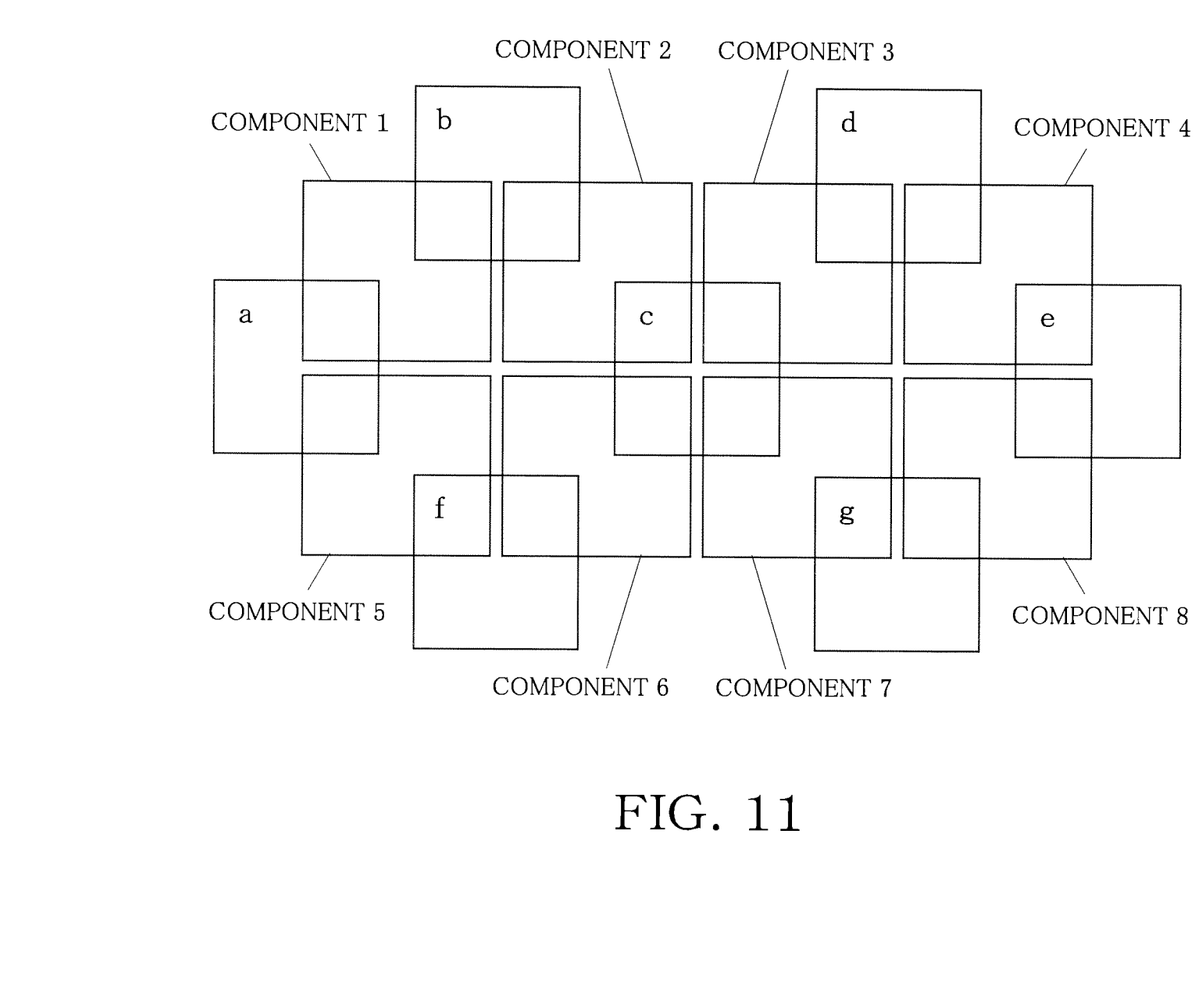
FIG. 11 is a drawing for describing another embodiment.

The present invention is not restricted to the process method described with reference to FIG. 2 and FIG. 3. For example, as depicted in FIG. 11, when a plurality of rectangular components 1 to 8 aligned and arranged in a tray or the like are imaged, imaging may be performed in the following procedure.

Imaging ranges a to g each with two corners of the components 1 to 8 positioned in a diagonal direction being taken as characteristic parts are determined. First, two imaging ranges a and b positioned in a diagonal direction of the component 1 are imaged with the camera. Since the imaging range b is also an imaging range of one characteristic part of the component 2, only the imaging range c of the other characteristic part of positioned in a diagonal direction of the imaging range b of one characteristic part of the component 2 is imaged. With this, by imaging three imaging ranges a to c, four characteristic parts of two components 1 and 2 can be imaged. Since the imaging range c is also an imaging range of one characteristic part of the component 3, only the imaging range d of the other characteristic part of positioned in a diagonal direction of the imaging range c of one characteristic part of the component 3 is imaged. Since the imaging range d is also an imaging range of one characteristic part of the component 4, only the imaging range e of the other characteristic part of positioned in a diagonal direction of the imaging range d of one characteristic part of the component 4 is imaged. With this, by imaging five imaging ranges a to e, eight characteristic parts of four components 1 to 4 can be imaged.

Since the imaged imaging ranges a, c, and e are also imaging ranges of one characteristic part of the components 5 to 8, the imaging range f including the corners of two components 5 and 6 and the imaging range g including the corners of two components 7 and 8 are each imaged. With this, by imaging seven imaging ranges a to g, sixteen characteristic parts of eight components 1 to 8 can be imaged. With this, a process of measuring the positions of eight components 1 to 8 can be efficiently performed.

Note that, in a component mounting machine in which a plurality of suction nozzles are retained by one placing head, when a plurality of components suctioned by the plurality of suction nozzles are each imaged with a camera to measure the component position, the corners of two components may be included in one imaging range as characteristic parts.

Also, a function of switching between component position measurement according to the present invention and component position measurement by divisional imaging of the entire area of a component may be provided. For example, measurement according to the present invention may be performed when production efficient is prioritized, component position, and component position measurement by divisional imaging of the entire area of a component may be performed when measurement accuracy is prioritized.

Still further, component position measurement according to the present invention may be normally performed, and the measurement may be switched to component position measurement by divisional imaging of the entire area of a component when an abnormality such as an abnormality in component mounting position occurs.

On the contrary, component position measurement by divisional imaging of the entire area of the component may be normally performed, and the measurement may be switched to component position measurement according to the present invention after it is confirmed that unevenness in component shape is small.

What is claimed is:

1. A component image processing apparatus that partially images a component larger than a field of view of a camera for image processing and measures a position of the component based on a result of the image processing, the apparatus comprising:

imaging range determining means that determines imaging ranges of a plurality of characteristic parts to be imaged obtained by division from a range of the component to be imaged;

combined image creating means that combines images of the plurality of characteristic parts obtained by imaging the plurality of characteristic parts with the camera to create a combined image of the characteristic parts of the component; and measuring means that measures a position of the component based on the combined image of the characteristic parts of the component, wherein the imaging range determining means automatically determines the imaging ranges of the plurality of characteristic parts based on either one or both of a shape and dimension of the component to be imaged and the field of view of the camera, and wherein the imaging range determining means determines two imaging ranges each taking two corners positioned in a diagonal direction of the component to be imaged as characteristic parts.

2. A component image processing apparatus that partially images a component larger than a field of view of a camera for image processing and measures a position of the component based on a result of the image processing, the apparatus comprising:

imaging range determining means that determines imaging ranges of a plurality of characteristic parts to be imaged obtained by division from a range of the component to be imaged;

combined image creating means that combines images of the plurality of characteristic parts obtained by imaging the plurality of characteristic parts with the camera to create a combined image of the characteristic parts of the component; and measuring means that measures a position of the component based on the combined image of the characteristic parts of the component, wherein the imaging range determining means automatically determines the imaging ranges of the plurality of characteristic parts based on either one or both of a shape and dimension of the component to be imaged and the field of view of the camera, and wherein the imaging range determining means divides an entire area of the component into partial areas as many as required for imaging based on a dimension of the component to be imaged and the field of view of the camera, and selects a plurality of partial areas in order of decreasing amount of information included in each partial area obtained by division as imaging ranges of the plurality of characteristic parts.

3. A component image processing apparatus that partially images a component larger than a field of view of a camera for image processing and measures a position of the component based on a result of the image processing, the apparatus comprising:

a controller configured to determine imaging ranges of a plurality of characteristic parts to be imaged obtained by division from a range of the component to be imaged;

combine images of the plurality of characteristic parts obtained by imaging the plurality of characteristic parts with the camera to create a combined image of the characteristic parts of the component; and measure a position of the component based on the combined image of the characteristic parts of the component, wherein the controller is further configured to determine the imaging ranges of the plurality of characteristic parts based on either one or both of a shape and dimension of the component to be imaged and the field of view of the camera, and wherein the controller is further configured to determine two imaging ranges each taking two corners positioned in a diagonal direction of the component to be imaged as characteristic parts.

4. A component image processing apparatus that partially images a component larger than a field of view of a camera for image processing and measures a position of the component based on a result of the image processing, the apparatus comprising:

a controller configured to determine imaging ranges of a plurality of characteristic parts to be imaged obtained by division from a range of the component to be imaged;

combine images of the plurality of characteristic parts obtained by imaging the plurality of characteristic parts with the camera to create a combined image of the characteristic parts of the component; and measure a position of the component based on the combined image of the characteristic parts of the component, wherein the controller is further configured to determine the imaging ranges of the plurality of characteristic parts based on either one or both of a shape and dimension of the component to be imaged and the field of view of the camera, and wherein the controller is further configured to divide an entire area of the component into partial areas as many as required for imaging based on a dimension of the component to be imaged and the field of view of the camera, and select a plurality of partial areas in order of decreasing amount of information included in each partial area obtained by division as imaging ranges of the plurality of characteristic parts.

* * * * *